Mar. 20, 1923.

F. MALBERTI

AUTOMOBILE BUMPER

Filed Nov. 7, 1921

1,449,339

F. Malberti
INVENTOR

BY Victor J. Evans
ATTORNEY

WITNESS:

Patented Mar. 20, 1923.

1,449,339

UNITED STATES PATENT OFFICE.

FELIX MALBERTI, OF MELLEN, WISCONSIN.

AUTOMOBILE BUMPER.

Application filed November 7, 1921. Serial No. 513,395.

*To all whom it may concern:*

Be it known that I, FELIX MALBERTI, a citizen of United States, residing at Mellen, in the county of Ashland and State of Wisconsin, have invented new and useful Improvements in Automobile Bumpers, of which the following is a specification.

My present invention has reference to a bumper for automobiles and such like vehicles.

My invention is primarily directed to the hanger or support for bumper bars and is designed to produce a means whereby the bumper is both yieldably and pivotally supported in a manner to reduce the impact of force in the event of contact with a vehicle or other obstacle and to assume an angle position when so contacted to afford a wiping engagement with the obstruction in counter-distinction to a direct force of impact so that the cars thus contacted will swerve away from each other and injury thereto reduced to a minimum.

The drawings illustrate a satisfactory reduction of the improvement to practice, and wherein:—

Figure 1:
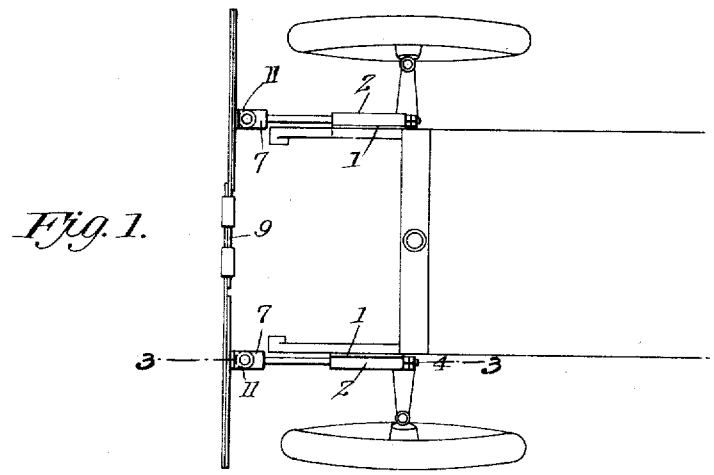
Figure 1 is a top plan view of a portion of an automobile illustrating the application of the improvement.
Figure 2:
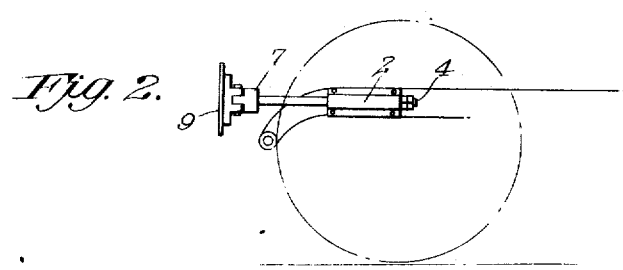
Figure 2 is a side elevation thereof, the dot and dash lines showing the relation of the wheel of the vehicle and the ground with the bumper.
Figure 3:
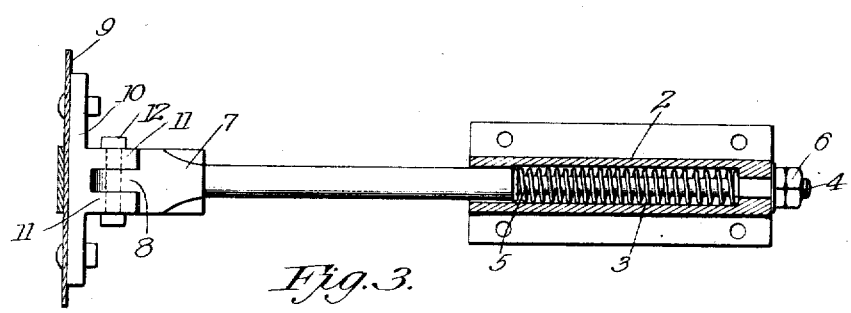
Figure 3 is a sectional view, on an enlarged scale and is approximately on the line 3—3 of Figure 1.

The brackets which provide the spring housings of my improvement may be variously shaped in cross section, one of such brackets, in Figure 1 of the drawings, having its inner face straight, and the other having its inner face of an angle formation. The brackets are bolted or otherwise secured to the side bars of the automobile frame, and the bumpers may, of course, be arranged at both the front and rear of the vehicle.

Except for the cross sectional formation, each of the brackets 1 is provided with a longitudinal barrel 2 which forms a housing for a helical spring 3. The barrel portion of each of the brackets has its outer end provided with an opening of a size approximately equalling that of its bore, and its inner end provided with a restricted opening. These openings receive therethrough a rod 4. One end of the rod is reduced, as at 5 to be received through the smaller inner openings in the brackets, the said reduced end being threaded and being engaged by adjusting nuts 6. The spring 3 exerts a pressure between the inner wall of the barrel and the shoulder between the rod and the reduced extension thereof, the said spring being disposed around the reduced extension 5 of the said rod, and the tension of the spring may be regulated by adjusting the nuts 6.

Each of the rods 4 has its outer end enlarged to provide the same with a head 7, the said head being centrally formed with an extension in the nature of a tongue or knuckle 8.

The bumper bar 9 may be of any construction and has secured upon its inner face, adjacent to its ends plates 10 provided with spaced extending ears 11. These ears are arranged to receive therebetween knuckles 7 of the respective rods 4, a pivot 12 passing through the ears and knuckles.

From the above description, when taken in connection with the drawings, it will be seen that the bumper bar 9 is pivotally connected to the rod 4 and that the rod 4 is influenced by the spring 3. The springs 3 will reduce the impact of force should the bumper bar be brought against an obstacle, and the hinge connection between the bumper bar and the rods will permit of the said bar assuming an angle and thus present an angle surface to the object contacted. The result is that instead of a straight contact with the obstacle, the bumper will have a wiping action thereagainst, the springs absorbing the shock incident to the contact before injury can be inflicted to either the vehicle or the object contacted therewith, and the angle arrangement of the bumper will cause the vehicle to swerve away from the object contacted.

It is thought that the foregoing description, when taken in connection with the drawings will fully set forth the construction, operation and advantages of the improvement and that further detailed description will not be necessary. It is thought necessary to state, however, that the improvement is not to be restricted to the precise details of construction herein recited and that I am entitled to all such changes therefrom as fall within the scope of what is claimed.

Having described the invention, I claim:—

A bumper for vehicles comprising brackets designed to be secured to the frame of the vehicle, a barrel secured to each bracket and arranged longitudinally thereon and the bore of each barrel being reduced at one end, a rod for each barrel and each of said rods having a reduced portion adjacent one end, said end being passed through and designed to project beyond the end of the barrel, a helical spring surrounding each reduced portion of the rods and having its end convolutions bearing against the shoulder formed by the reduced portion of the rod and the shoulder formed by the reduction of the bore, adjusting nuts threadedly mounted on the projecting end of the reduced portion of the rods and adapted to secure each rod within its respective bore and to tension the helical spring, a head provided on the end of each rod opposing the reduced portion, a tongue centrally formed with the head, a bumper bar adapted to be arranged horizontally beyond the vehicle, plates secured on the inner face of said bumper bar adjacent its ends thereof, spaced extending ears provided for each plate and a pivot loosely securing the tongue of the head between the spaced ears as and for the purpose specified.

In testimony whereof I affix my signature.

FELIX MALBERTI.